United States Patent [19]
Kleinebenne et al.

[11] Patent Number: 4,598,922
[45] Date of Patent: Jul. 8, 1986

[54] BICYCLE FRAME

[75] Inventors: Dieter Kleinebenne; Fred Kleinebenne, both of Bielefeld, Fed. Rep. of Germany

[73] Assignee: Huffy Corporation, Dayton, Ohio

[21] Appl. No.: 385,284

[22] Filed: Jun. 4, 1982

[30] Foreign Application Priority Data

Jun. 13, 1981 [DE] Fed. Rep. of Germany ... 8117517[U]

[51] Int. Cl.$^4$ .............................................. B62K 11/02
[52] U.S. Cl. ..................... 280/279; 280/274; 280/281 R; 403/298
[58] Field of Search ................... 280/279, 274, 281 R; 403/292, 293, 294, 296, 298

[56] References Cited

U.S. PATENT DOCUMENTS

| 704,288 | 7/1902 | Anderson | 403/292 |
|---|---|---|---|
| 2,091,982 | 9/1937 | Hart | 280/281 R |
| 2,144,332 | 2/1939 | Glaser | 280/281 R |
| 2,702,926 | 3/1955 | Rahaim | 403/298 |
| 3,883,257 | 5/1975 | Delafield | 403/298 |

FOREIGN PATENT DOCUMENTS 540625  9/1955  Belgium ............................. 280/219

OTHER PUBLICATIONS

European Patent publication Ser. No. 79102691.7, published Feb. 6, 1980.

Primary Examiner—John J. Love
Assistant Examiner—Donn McGiehan
Attorney, Agent, or Firm—Alan M. Grimaldi; Joseph P. Lavelle

[57] ABSTRACT

In a bicycle frame including a plurality of tubes, at least one sleeve coupling connecting two of these tubes together, a separate pipe socket fastened within the sleeve coupling so as to project therefrom, with one of the two tubes being fitted around the pipe socket to contact the exterior surface of the pipe socket, and a layer of a metal adhesive or the like disposed between, and connecting together, the interior surface of the one tube and the exterior surface of the pipe socket, the exterior surface of the pipe socket is mechanically roughened.

10 Claims, 4 Drawing Figures

BICYCLE FRAME

BACKGROUND OF THE INVENTION

The present invention relates to a bicycle frame of the type having sleeve couplings forming connecting means between a first tubular frame section and a second tubular frame section fastened thereto by means of an adhesive bond, with a separate pipe socket being fastened in the sleeve coupling and projecting therefrom, and a second tubular frame section fitting over this projecting pipe socket. In order to rigidly connect the exterior of the pipe socket with the interior of the second tubular frame section, it is known to dispose a layer of a metal adhesive or the like therebetween.

SUMMARY OF THE INVENTION

It is an object of the present invention to provide a bicycle frame of this type in which, on the one hand, the permanent, or non-releasable, connection of the tubular frame sections is reinforced by means of sleeve couplings and, on the other hand, assembly as well as preparatory work are simplified.

The above and other objects are achieved, according to the present invention, in a bicycle frame of the above type, basically in that the exterior of the pipe socket is mechanically roughened. Preferably, this roughening is effected by sand blasting so that with a good fit, each sleeve coupling with its pipe socket and the second frame section forms a secure, rigid, permanent unit. As a result of the roughening, the exterior surface of the separate pipe socket offers an excellent anchor for the adhesive which is present as a layer between this roughened exterior of the pipe socket and the interior surface of the second tubular frame section encasing it and establishes the substantially rigid connection between the parts.

Dependent on circumstances, this roughening may be provided on the entire surface of the pipe socket or, advantageously, axially extending strip-shaped or axially spaced annular roughened sections may be worked in mechanically.

Further features of the invention will be described below.

Thus, the end of the pipe socket may advantageously be sloped over a long section or may have a narrow chamfer. This form of construction has the advantage that the second tubular frame section can easily be pushed over the separate socket which is fastened in the sleeve coupling and the adhesive can distribute itself in a thin layer over the roughened surface of the pipe socket to assure, as a full-area adhesive layer, the permanent, secure fastening of the above-mentioned parts.

DESCRIPTION OF THE PREFERRED EMBODIMENTS

Figure 1:
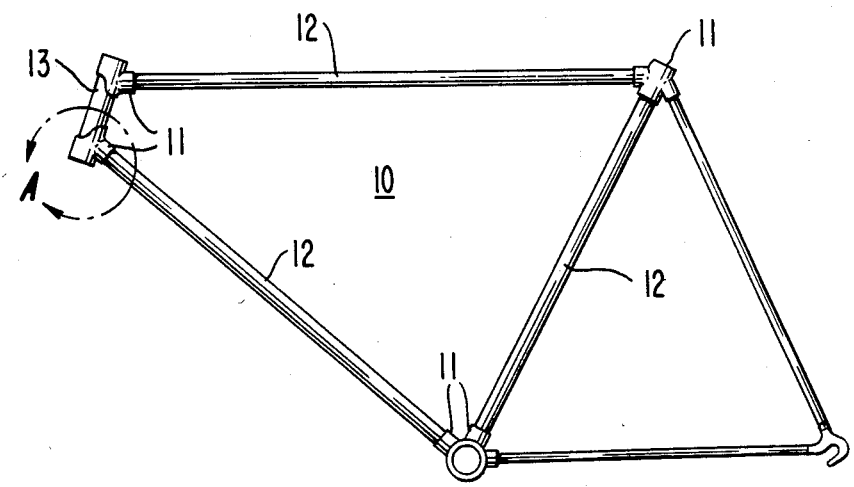
FIG. 1 is an elevational view of a bicycle frame formed of three tubular frame sections, or tubes, a head tube, a pedal crank axle bearing housing and connecting sleeve couplings.

The bicycle frame 10 shown in FIG. 1 includes six sleeve couplings 11 with which, for example, three tubular frame sections, or tubes, 12 are held together.

The sleeve coupling 11 shown, for example, in region "A" of FIG. 1, on the one hand, includes a portion forming a ring or a band enclosing the head tube 13 and a tubular portion accommodating part of a pipe socket 14 which is permanently connected with sleeve coupling either by being pressed in or by welding, soldering or the like.

This pipe socket 14 is made of steel and its exterior surface has been provided with a fine roughening 15 in the form of recesses which, on the one hand, can be easily produced mechanically and, on the other hand, provide a surface that resists sliding so as to provide good adhesion with an adhesive layer 16 of, for example, a metal adhesive of known type. The open end of a tube 12 whose annular frontal face abuts fully and tightly against the frontal face of the associated sleeve coupling 11, fits securely over this roughened pipe socket 14. This tube 12 is made of a light metal, preferably aluminum, as can all of the other frame tubes. Layer 16 can advantageously have a thickness of 50 to 300$\mu$.

Figure 2:
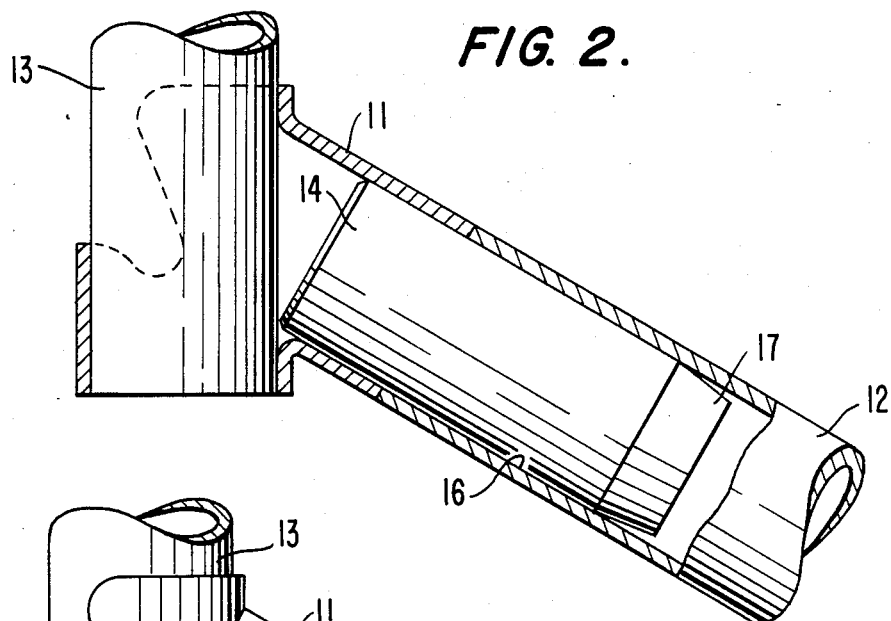
FIG. 2 is an elevational detail view, to an enlarged scale and partly in cross section, of the portion of the frame of FIG. 1 enclosed by the circle "A", constructed according to one embodiment of the invention.
Figure 3:
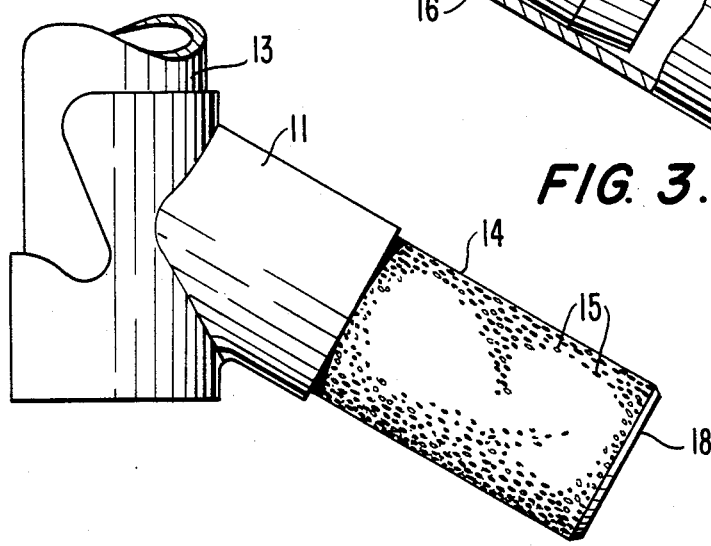
FIG. 3 is a view similar to that of FIG. 1, but completely in elevation and with the tubular frame section removed, of a second embodiment of the invention.
Figure 4:
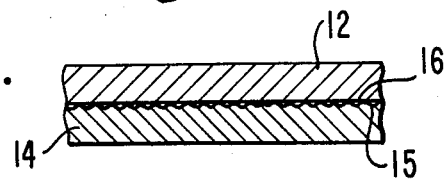
FIG. 4 is a cross-sectional detail view, to an enlarged scale, through the walls of the pipe socket showing the roughening, on the one hand, and the tubular frame engaging thereover, on the other hand.

As shown in FIG. 2, the end of the pipe socket 14 which extends into the tube 12 is provided with a relatively long tapered outer surface 17. In the embodiment shown in FIG. 3, this tapered portion is short and has the form of a chamfer 18. Such tapered portions facilitate the placement of the tube 12 onto the pipe socket 14 on the one hand, and, on the other hand, promote a uniform distribution of the adhesive 16 on the exterior of the pipe socket during assembly with the tube.

The roughening, which can easily be produced procedurally by sand blasting at high pressure, produces a fine-grained surface which constitutes an excellent gripping surface for the adhesive which connects the pipe socket 14 with the aluminum frame tube 12 in such a firm manner that no breaks can occur in the region of the sleeve coupling 11 although the pipe socket 14 projects only to a relatively short length into the tube 12 into which it is inserted. The pipe socket 14 is cylindrical and therefore can easily be produced from a section of steel tubing which need only be cut to the required length.

Such a steel pipe socket 14 provides a frame tube connection for a light metal frame and gives it high stability and reduced weight. The resulting saving in weight has a favorable effect on shipping such a bicycle as well as on its riding characteristics.

As will be readily apparent, each of the coupling sleeve 11 shown in FIG. 1 can be constructed according to the invention. Alternatively, certain manufacturing requirements could dictate or justify the use of only one or several coupling sleeve structures according to the invention.

It will be understood that the above description of the present invention is susceptible to various modifications, changes and adaptations and the same are intended to be comprehended within the meaning and range of equivalents of the appended claims.

What is claimed is:

1. In a bicycle frame including a plurality of tubes made of a light metal at least one sleeve coupling connecting two of these tubes together, a separate pipe socket made of steel, fastened within said sleeve coupling so as to project therefrom, with one of said two tubes being fitted around said pipe socket to contact the exterior surface of said pipe socket, and a layer of nonmetallic adhesive disposed between, and connecting together, the interior surface of said tube and the exterior surface of said pipe socket, the improvement wherein said exterior surface is cylindrical in shape along the bonding surface of said socket and is randomly roughened to have a fine-grained surface.

2. Bicycle frame as defined in claim 1 wherein the roughening is provided over the entire surface area of said exterior surface.

3. Bicycle frame as defined in claim 1 wherein the roughening is confined to strip-shaped regions of said exterior surface which extend along the length of said pipe socket.

4. Bicycle frame as defined in claim 1 wherein the end of said pipe socket extending toward said one tube is chamfered.

5. Bicycle frame as defined in claim 1 wherein said one tube and said sleeve coupling fully abut against one another in the region of said pipe socket.

6. Bicycle frame as defined in claim 1 wherein said pipe socket is press-fitted into said sleeve coupling.

7. Bicycle frame as defined in claim 1 wherein said layer of metal adhesive or the like has a thickness of 50 to 300μ.

8. Bicycle frame as defined in claim 1 wherein said sleeve coupling includes a ring portion enclosing the other of said two tubes and via which said coupling is connected to said other of said two tubes.

9. Bicycle frame as defined in claim 1 wherein there is a plurality of said sleeve couplings and pipe sockets connecting respective pairs of said tubes together.

10. Bicycle frame as defined in claim 1, wherein said exterior surface of said pipe socket is randomly roughened by means of sand blasting.

* * * * *